United States Patent [19]

Boni

[11] 4,102,974
[45] Jul. 25, 1978

[54] POLYOLEFIN CONTAINERS HAVING IMPROVED GAS BARRIER PROPERTIES

[75] Inventor: Kenneth A. Boni, Wheaton, Ill.

[73] Assignee: The Continental Group, Inc., New York, N.Y.

[21] Appl. No.: 791,091

[22] Filed: Apr. 26, 1977

[51] Int. Cl.² ............................................. B29D 23/01
[52] U.S. Cl. ................................. 264/294; 260/42.56; 260/42.57; 260/889; 260/897 C; 264/331
[58] Field of Search ............................... 264/294, 331; 260/897 C, 889, 42.56, 42.57

[56] References Cited

U.S. PATENT DOCUMENTS

| 3,075,946 | 1/1963 | Zupic | 260/897 C |
| 3,234,313 | 2/1966 | Miller | 260/897 C |
| 3,694,402 | 9/1972 | Essam | 260/42.56 X |
| 3,891,598 | 6/1975 | Marzolf | 260/42.56 |
| 3,923,190 | 12/1975 | Roth | 220/67 |
| 4,012,348 | 3/1977 | Chelland | 260/42.57 X |

Primary Examiner—Jeffery R. Thurlow
Attorney, Agent, or Firm—Paul Shapiro; Joseph E. Kerwin; William A. Dittmann

[57] ABSTRACT

Polyolefin containers having improved gas barrier properties are prepared by forming a billet comprised of a particle mixture of a polyolefin resin, such as polyethylene, an inorganic filler such as $CaCO_3$ and at least about 13.5% by volume of a vinylidene chloride polymer having a median particle diameter greater than 150 microns. The billet is heated to a temperature of about 25° to 40° F above the melting temperature of the vinylidene chloride polymer and then molded into a hollow container.

9 Claims, No Drawings

POLYOLEFIN CONTAINERS HAVING IMPROVED GAS BARRIER PROPERTIES

BACKGROUND OF THE INVENTION

Field of the Invention

This invention relates to molding polyolefin containers and more particularly to molding polyolefin containers having improved gas barrier properties.

In the manufacture of canned foodstuffs, e.g., meat products as ham, corned beef hash, chili and beef stew, the containers, usually metal cans, are filled with the foodstuff, covered with a metal end closure and sealed.

One of the disadvantages of canning meat products in metal containers is that the presence of the food product may cause the interior of the container to corrode, which corrosion results in contamination and deterioration of the food product.

Attempts to substitute certain inert synthetic resin materials, such as polyethylene and polypropylene for metal in the canning of foodstuffs, have encountered the disadvantage that such resin materials are excessively permeable to gases, such as oxygen, and the permeation of oxygen into the container causes an undesirable discoloration and a depreciation in the taste and qualities of the foodstuff.

The high gas permeability characteristics of synthetic resins, such as polyethylene, has resulted in containers fabricated from such resins being rejected in the packaging of oxygen sensitive comestibles where due to the chemical inertness of the resin, it might otherwise be employed to great advantage.

The art has devised a number of ways to reduce the gas permeability of polyethylene and other polyolefin resins. Included in these methods is the fabrication of the container from a laminate formed from a plurality of layers of thermoplastic material, one of the layers being formed from a thermoplastic resin which exhibits high gas barrier properties, such as vinylidene chloride polymers, and acrylonitrile polymers, e.g. U.S. Pat. Nos. 3,453,173, 3,464,546 and 3,615,308. Other methods include incorporating in the thermoplastic resin a filler material such as wood flour, inorganic mineral fillers such as clay or mica, e.g., U.S. Pat. Nos. 3,463,350 and 3,668,038, or a second resin, such as nylon which has high gas barrier properties, e.g., U.S. Pat. Nos. 3,093,255 and 3,373,224. Although these prior art methods are effective in reducing the gas permeability of polyolefin resins, the gas permeability requirements for the most sensitive foodstuffs have still not been effectively met by containers fabricated from polyolefin resins.

SUMMARY OF THE INVENTION

In accordance with the present invention there is provided a process for the manufacture of polyolefin containers having reduced permeability to gases wherein a billet is formed from a homogeneous particle mixture of a polyolefin resin, an inorganic filler and at least about 13.5% by volume of a vinylidene chloride polymer having a median particle diameter of at least 150 microns, the billet is heated to a temperature of about 25° C to 40° C above the melting point of the vinylidene chloride polymer and thereafter the billet is molded or otherwise shaped into a hollow container having walls exhibiting low permeability to the transmission of gases, particularly oxygen.

PREFERRED EMBODIMENTS

The term "vinylidene chloride polymer" includes within its meaning vinylidene chloride homopolymers and copolymers of vinylidene chloride containing between 70 and 98 percent by weight polymerized vinylidene chloride with the remainder being any other monoethylenically unsaturated monomeric material which is copolymerizable with vinylidene chloride. Monomeric materials suitable for copolymerization with vinylidene chloride to prepare copolymers thereof include vinyl chloride, acrylonitrile, acrylic or methacrylic acid and their ester derivatives.

Vinylidene chloride polymers useful in the practice of the present invention have melting points in the range of about 280° F - 350° F.

It is essential to the practice of the present invention that the billet prepared from the mixture of polyolefin resin, filler and vinylidene chloride polymer particles be heated to a temperature of about 25° to 40° F greater than the melting point of the polymer at the time of molding the billet into a hollow container. As will hereinafter be illustrated, if the billet is heated to a temperature less than about 25° F above the melting point of the vinylidene chloride polymer, the container formed from the billet will not have the gas barrier properties required for use in the packaging of oxygen sensitive, perishable comestibles, such as meat products. If the billet is heated to a temperature greater than about 40° F above the melting point of the vinylidene chloride polymer, unacceptable heat degradation of the vinylidene chloride polymer occurs rendering the container product formed from the billet unsuitable for packaging purposes.

It is also critical to the practice of the present invention that the vinylidene chloride polymer used to prepare the preform have a median particle diameter greater than about 150 microns and preferably about 180 to 250 microns. As will hereinafter be illustrated, if the median particle diameter of the vinylidene chloride polymer used in the preparation of the billet is less than 150 microns, containers produced from the preform will exhibit gas permeabilities which render the containers unsuitable for the packaging of oxygen sensitive foodstuffs.

It is further critical to the practice of the present invention that the vinylidene chloride polymer be present in the billet in an amount of at least about 13.5% by volume. If amounts of vinylidene chloride polymer present in the billet are substantially less than about 13.5% by volume, containers formed from the billet lack the gas barrier properties required for extended shelf-life of foods packaged in the containers, e.g., 18 months or more. Generally the vinylidene chloride polymer is included in the billet in an amount ranging from about 14.0 to about 20.0 volume percent.

The term "polyolefin" includes within it meaning olefin polymers, such as polyethylene, polypropylene, poly-1-butene, poly-4-methyl-pentene-1 and other homopolymers and copolymers of similar mono-1-olefins having up to 8 carbon atoms per molecule. Of these, high density (0.950–0.968) polyethylene, is preferred. The median diameter of the polyolefin resin particles used to prepare the billet may vary from 5 to 100 microns, preferably 10 to 30 microns.

Filler materials which may be employed in the practice of the present invention include mineral fillers, such as $TiO_2$, $CaCO_3$, clay-like materials having a platelike or platelet structure, such as mica, vermiculite, talc, as well as siliceous fillers, such as silica, calcium silicate and aluminum silicate. Of these $CaCO_3$ is the preferred inorganic filler material.

The median diameter of the filler particles used to prepare the billet may vary from 0.1 to 30 microns, preferably 0.5 to 15 microns.

In preparing the billet, the mixture of components includes about 20 to about 90% by weight of the polyolefin resin and preferably about 30 to about 65% by weight of the polyolefin resin 0 to about 70% by weight of the filler and preferably about 20 to about 55% by weight and about 10 to about 30% by weight of the vinylidene chloride polymer, and preferably about 15 to about 25% by weight.

The billet used in accordance with the present invention can be any shape such as circular, square or polygonal and can be prepared by preparing a homogeneous mixture of the polyolefin resin, filler and vinylidene chloride polymer and then extruding the mixture into a shaped structure such as a rod and then cutting the composite rod or other shaped composite structure into a billet of the desired dimensions. The actual dimensions of the billet will be determined by experimentation with the particular molding chamber and die member configuration and the total volume of the billet will be that which is sufficient to meet the dimensional requirements of the desired container.

A second and preferred method for preparing the billet is to compact a homogeneous mixture of the polyolefin resin, filler and vinylidene chloride polymer particles, e.g., at pressures of 12,500 to 30,000 pounds per square inch (psi) to the desired shape and contour of the billet. Thereafter the compacted mixture is heated to a temperature of about 25° to 40° F above the melting temperature of the vinylidene chloride polymer for a time sufficient to fuse the resin particles. The so-prepared, heated billet is then ready for subsequent compression molding or forging to form the hollow container.

One method of forming hollow containers from the billet is to clamp the billet heated to a temperature of about 25° to 40° above the melting point of the vinylidene chloride polymer at its peripheral outer portion and gradually deform or otherwise forge the unclamped central portion, while in a heated state, by forcing a plunger down on unclamped portion resulting in the unclamped material being drawn under the plunger for forming the sidewalls of the container as the plunger descends.

A second method to produce containers from the billet is to clamp the heated billet at its outer peripheral area and then subjecting the heated billet to vacuum forming conditions to shape the billet into a hollow container.

A preferred forming method is disclosed in copending application Ser. No. 437,453, now abandoned, filed Jan. 28, 1974 and U.S. Pat. No. 3,923,190, the teachings of which are herein incorporated by reference. In this molding method, a billet heated to about 25° to 40° F above the melting point of the vinylidene chloride polymer is compressed between a pair of opposed die members having different dimensions and adapted to advance through a molding chamber, the first die member being spaced apart from the interior walls of the molding chamber and defining a mold cavity therebetween, the second die member being arranged to move telescopically with respect to the interior walls of the chamber. The die members may be heated in the range of 100°–400° F to assist resin flow into the mold cavity. The billet as it is advanced through the molding chamber is compressed with sufficient force to cause the billet material to flow radially outward from between the die members and extrude into and fill the mold cavity.

The walls of the molding chamber are maintained at a temperature below the solidification temperature of the billet material and the material is solidified as it is extruded into the cavity.

The advancement of the die members through the molding chamber causes a continuous layer of material to be deposited and solidified within the mold cavity, the thickness of the material deposit being determined by the dimensions of the cavity. The extruded material cooled to the solidification temperature of the material forms an integral solid hollow article which is then ejected from the molding chamber.

The invention is further illustrated by the following Examples.

Example I

A mixture suitable for forming into billets was formed from 10.4 grams polyethylene powder having a density of 0.95 g/cc and a median particle diameter of 25 microns, 10.4 grams of $CaCO_3$ particles having a median particle diameter of 11 microns and 5.9 grams (19.3 volume percent) of a vinylidene chloride polymer having a melting point of 338° F and composed of 91% by weight vinylidene chloride and 9% vinyl chloride of varying mean particle diameters. Also included in the mixture were 0.83 gram $TiO_2$) 0.14 gram MgO, pigments and 0.03 gram Irganox 1010, a hindered phenol type anti-oxidant. The mixture was compressed at 28,000 psi into 2 inch diameter discs having a thickness of 300 mils. Separate discs were heated in a heating device to 350° F and 375° F for 9 minutes under ambient pressure conditions. At the end of the heating period, the discs were placed in a compression molding apparatus of the type described in U.S. Pat. No. 3,923,190. The heated disc was placed between the pair of opposed die members of the apparatus. The upper die member was heated to 350° F and the lower die member was heated to a temperature of 125° F. The disc was compressed under pressure of approximately 30 tons with a hydraulic press which radially extruded the disc material into the molding cavity of the apparatus to form the sidewalls of the container as the die members decended in the molding chamber.

Three seconds after placement of a heated disc in the molding apparatus, an integral cylindrical hollow container having a capacity of 10 ounces, an average sidewall thickness of 28 mils and a bottom wall thickness of 35 mils was ejected from the molding chamber.

The oxygen leak rate of containers was determined by closing the open end with a metal end and sealing the end with an epoxy sealant and attaching the closed container to a Mocon Oxtran 100 instrument.

The oxygen leak rate of containers for packaging of oxygen sensitive foodstuff requires an oxygen leak rate below 0.1 cc/100in$^2$—24 hr—atoms. at 73° F as measured by the aforementioned instrument.

The oxygen leak rates of containers fabricated from the above mixtures containing vinylidene chloride polymer powders having median particle diameters of 185 and 225 microns are recorded in the Table I below. For purposes of comparison, the oxygen leak rate of containers fabricated from mixtures containing vinylidene chloride polymer powder having a mean particle diameter of 15 microns is also recorded in the Table I below.

TABLE I

| Vinylidene Chloride Polymer Median Particle Diameter (Microns) | Oxygen Leak Rate* Billet Temperature | |
|---|---|---|
| | 350° F** | 375° F*** |
| 15 | 0.53 | 0.13 |
| 185 | 0.31 | 0.062 |
| 225 | 0.076 | — |

*oxygen leak rate values given in cc/100 in²- 24 hr.-atmos. at 73° F
**Δ T = 12° F
***Δ T = 37° F

EXAMPLE II

The procedure of Example I was repeated except the vinylidene chloride polymer was a copolymer of 81% by weight vinylidene chloride and 19% by weight vinyl chloride having a melting point of 293° F. The oxygen leak rates of containers molded from billets heated to 355° F using this vinylidene chloride polymer resin are recorded in Table II below.

TABLE II

| Vinylidene Chloride Polymer Median Particle Diameter (Microns) | | oxygen Leak Rate* |
|---|---|---|
| Less than | 149 | 0.12 |
| | 185 | 0.088 |
| Greater than | 225 | 0.072 |

EXAMPLE III

The procedure of Example I was repeated except that the billet heating temperature was varied from 338° F-390° F. The oxygen leak rate of containers fabricated the material mixture are recorded in Table III below.

TABLE III

| Billet Temperature (° F) | Δ T (° F) | Oxygen Leak Rate* |
|---|---|---|
| 338° | 0 | 0.55 |
| 350° | 12° | 0.31 |
| 362° | 24° | 0.093 |
| 375° | 37° | 0.064 |
| 390° | 52° | 0.052**** |

****Unacceptable browning of container sidewalls observed.

The data recorded in Tables I-III of this specification indicate that the oxygen leak rate of containers compression molded from mixtures of polyethylene, $CaCO_3$ and vinylidene chloride/vinyl chloride copolymers is dependent upon the particle size of the copolymer and the temperature to which the billet is heated prior to molding into containers. Thus, if the median particle diameter of the vinylidene chloride copolymer is greater than about 150 microns and the billet heating temperature is about 25° F-40° F higher than the melting point of the copolymer, containers having oxygen leak rates less than 0.1 cc/100in²24 hr.—atmos. at 73° F are molded from the mixtures and are suitable for packaging of oxygen sensitive foodstuffs. If either the median particle diameter of the vinylidene chloride polymer or the billet heating temperature is outside the limitations of the present invention, containers having oxygen leak rates greater than 0.1 cc/100in²—24 hr. —atmos. at 73° F are molded from the mixtures or the sidewalls are degraded to a brown color rendering the containers unsuitable for the packaging of foodstuffs.

EXAMPLE IV

The procedure of Example I was repeated except the mixture contained 13.3 grams of the polyethylene, 8.9 grams of the $CaCO_3$ and 4.8 grams (13.7 volume percent) of the vinylidene chloride polymer. Containers forged from billets heated to 375° F had leak rates of 0.095 cc/100in²—24 hr. —atmos. at 73° F.

By way of contrast when the procedure of Example IV was repeated with the exception that the billet mixture contained 13.8 grams polyethylene, 9.2 grams $CaCO_3$ and 4.1 grams (11.6 volume percent) of the vinylidene chloride polymer, containers forged from the billets had leak rates of 0.14 cc/100in²24 hr. —atmos. at 73° F.

What is claimed is:

1. A method of forming a thermoplastic container having increased resistance to gas permeability which comprises preparing a billet comprised of a mixture of a moldable polyolefin resin, an inorganic filler and at least about 13.5 volume percent of a vinylidene chloride polymer resin having a median particle diameter greater than 150 microns and then molding the billet into a hollow container at a temperature of about 25° to about 40° F greater than the melt temperature of the vinylidene chloride polymer.

2. The method of claim 1 wherein the polyolefin resin is polyethylene.

3. The method of claim 1 wherein the polyolefin resin is polypropylene.

4. The method of claim 1 wherein the vinylidene chloride polymer is comprised of about 80 to about 95% by weight of vinylidene chloride and 5 to 20 percent by weight of a comonomer.

5. The method of claim 4 wherein the comonomer is vinyl chloride.

6. The method of claim 1 wherein the particle size of the vinylidene chloride polymer ranges from about 180 to about 250 microns.

7. The method of claim 1 wherein the melting point of the vinylidene chloride polymer ranges from about 290° to 350° F.

8. The method of claim 1 wherein the filler is $CaCO_3$.

9. The method of claim 1 wherein the billet mixture is comprised of about 20 to about 90% by weight of the polyolefin, 0 to about 70% by weight of the filler and about 10 to about 30% by weight of the vinylidene chloride polymer.

* * * * *